United States Patent [19]
Kojima
[11] 4,114,765
[45] Sep. 19, 1978

[54] APPARATUS FOR ROTATING HEAVY OBJECTS

[75] Inventor: Yoichi Kojima, Tokyo, Japan
[73] Assignee: Planning Kogyo Kabushiki Kaisha, Tokyo, Japan

[21] Appl. No.: 745,815
[22] Filed: Nov. 29, 1976
[51] Int. Cl.[2] .............................................. B65G 17/48
[52] U.S. Cl. .................................. 214/1 QC; 269/46; 294/74; 294/81 R
[58] Field of Search ........... 214/1 QC, 1 QD; 294/74, 294/81 R, 81 SF; 269/46, 77

[56] References Cited

U.S. PATENT DOCUMENTS

| | | | |
|---|---|---|---|
| 2,793,904 | 5/1957 | Gale | 294/74 |
| 3,545,629 | 12/1970 | Kaplan | 214/1 QC |
| 3,602,544 | 8/1971 | Marsh | 294/74 |
| 3,841,498 | 10/1974 | Heidrich | 214/1 QC |

FOREIGN PATENT DOCUMENTS

| | | | |
|---|---|---|---|
| 53,284 | 1/1967 | German Democratic Rep. | 294/74 |
| 137,250 | 3/1961 | U.S.S.R. | 294/81 R |

*Primary Examiner*—Drayton E. Hoffman
*Assistant Examiner*—George F. Abraham
*Attorney, Agent, or Firm*—Gifford, Chandler, VanOphem, Sheridan and Sprinkle

[57] ABSTRACT

Apparatus for rotating a heavy object about its longitudinal axis consisting of an I-beam having a number of openings along its length and a pair of units for revolving endless cords for supporting the heavy object. The units are attached to the I-beam by pins inserted through the openings and are lifted by a crane together with said I-beam. Further, means are provided to prevent slip of the cord at the pulleys and disengagement of the cord from the pulleys when the cords slacken.

3 Claims, 6 Drawing Figures

APPARATUS FOR ROTATING HEAVY OBJECTS

BACKGROUND OF THE INVENTION

I. Field of the Invention

The present invention relates to apparatus for manipulating heavy objects and more particularly to such an apparatus including means for rotating an object around its longitudinal axis while the object is suspended to facilitate work being performed on the object.

II. Description of the Prior Art

An apparatus for rotating a heavy object about its longitudinal axis while the object is suspended such apparatus including a horizontal beam adapted to be lifted by a crane and a pair of driving units slidably attached to said beam for revolving endless cords supporting the heavy object has been known. Each of the driving units is provided with a reversible electric motor which drives pulleys.

In use, the position of the driving units is adjusted by sliding them along the horizontal beam in dependence upon the length and weight of the object to be rotated so as to distribute the weight of the object equally to the driving units. After the end portions of the objects are inserted into the lower loop portions of both endless cords respectively, the horizontal beam together with the driving units are lifted by means of a crane. When both endless cords tighten enough to suspend the object, the electric motors of both driving units are started simultaneously so as to revolve the endless cords in the same direction so as to rotate the object to the desired position.

Such apparatus is useful to carry out welding operations on heavy objects such as trusses, honey combs and the like, but it has the disadvantage of the horizontal beam being subjected to great bending moments due to the heavy object as well as the risk of slip of the cords on the pulleys and disengagement of the cords from the pulleys when the cords slacken.

SUMMARY OF THE PRESENT INVENTION

The present invention has for its object to do away with the above mentioned disadvantages.

According to the present invention, the tops of both driving units are connected by means of cords and the center of the connecting cords is hung from a crane so that bending moments on the horizontal beam due to the heavy object are substantially reduced. Further, unequal distribution of the weights, if any, on the driving units may easily be balanced by adjusting the hanging point of the connecting cords from the crane.

Also according to the present invention, an I-beam is provided with a number of openings along its length. And, each driving unit is attached to the I-beam by means of a pin inserted in one of the openings. As each driving unit is pin-jointed to the beam, the unit can always be held vertically by the weight of the heavy object notwithstanding the slanted beam and thus the object can be maintained in a horizontal position.

Further, according to the present invention, within the driving unit, more than two pulleys are employed in order to prevent slip of the endless cord and special means are provided for preventing the disengagement of the cords from the pulleys when the cord slacken.

DESCRIPTION OF THE DRAWINGS

For the purpose of explaining the invention, examples embodying the same have been shown in the accompanying drawings. In said drawings.

DESCRIPTION OF A PREFERRED EMBODIMENT

Figure 1:
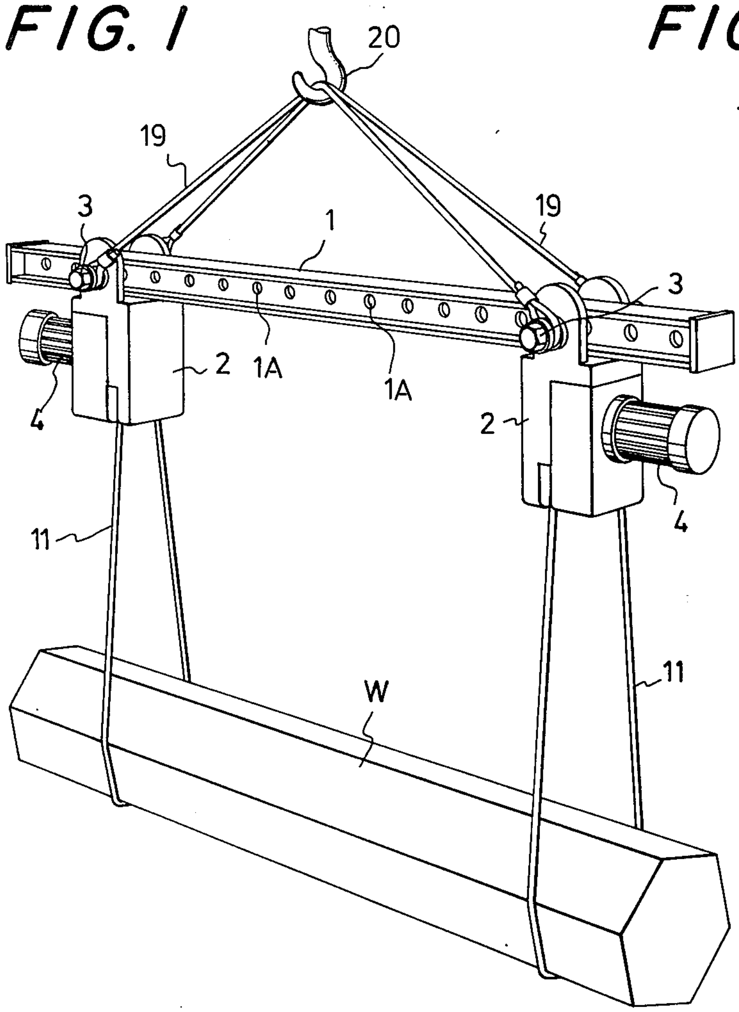
FIG. 1 is a perspective view of the apparatus embodying my improvements.

In the example shown in the drawing the apparatus for rotating a heavy object W comprises an I-beam 1 having a number of openings 1A along its vertical wall for attaching driving units 2 by pins 3 inserted through the openings 1A. The pins 3 of each unit 2 are connected by means of cords 19 to the other unit 2 and the middle point of the cords 19 is hung by a crane hook 20. The cords 19 can, of course, be of any suitable material and could instead, if preferred, be wire, rope, chain or similar members.

Each driving unit 2 is provided with a reversible electric motor 4 for driving pulleys arranged within the unit. Although it has been preferred to disclose electric motors 4 as the driving means for the driving units 2 it should be apparent that pneumatic, hydraulic or mechanical devices could be used in place of the electric motors 4, if preferred.

FIGS. 2, 3, 4 and 5 show three different arrangements of pulleys within the driving unit 2.

Figure 2:
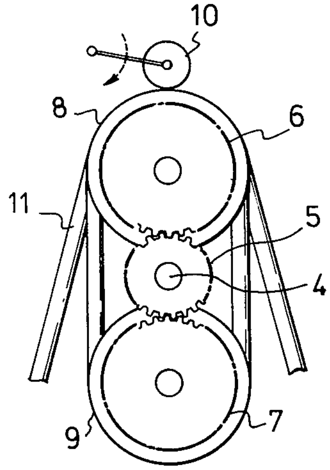
FIG. 2 shows an arrangement of driving and driven wheels and pulleys coaxial with the driven wheels, and a slip preventing pulley within the driving unit.
Figure 3:
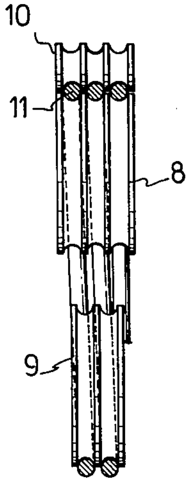
FIG. 3 is a partial side view of FIG. 2 showing only pulleys.

In FIGS. 2 and 3, 14 is a motor shaft having a coaxial gear 5 which engages with gears 6 and 7. Pulleys 8 and 9 are each coaxial with gears 6 and 7 respectively. An endless cord 11 is wound around the pulleys 8 and 9.

As the contact surfaces between the cord 11 and the pulleys 8 and 9 are large, slip seldom occurs and an additional pulley 10 is preferably provided to compress the upper part of the cord 11 by means of a spring (not shown) whereby not only slip of the cord 11 but also disengagement of the cord 11 from the grooves of the pulleys 8 and 9 when the cord 11 slackens may be prevented.

In use, the heavy object W is supported by the lower loops of the cord 11, and the positions of the driving units 2 are adjusted by means of the pins 3 being inserted in the appropriate openings 1A. The middle point of the connecting cords 19 is hung by a crane hook 20. If the beam 1 slants due to unbalanced weight of units 2, the hanging point may be varied so as to keep the beam horizontal.

Then the electric motors 4 are started simultaneously whereby the revolutions of the cords 11 act to rotate the object W around its longitudinal axis. When the object W rotates to the desired position, the electric motors 4 are halted. When the rotations of the electric motors are reversed, the object W can be returned to its original position.

Figure 4:
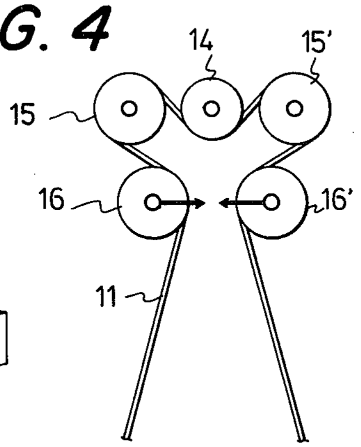
FIG. 4 shows another arrangement of driving pulley and four auxiliary driven pulleys.
Figure 5:
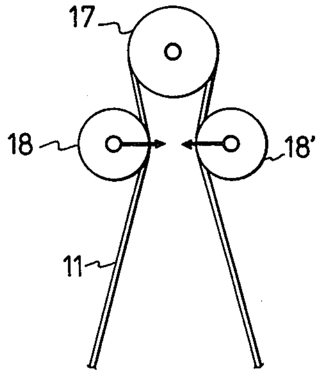
FIG. 5 shows the other arrangement of driving pulley and two auxiliary pulleys.

FIG. 4 shows another arrangement including a motor driven pulley 14 and auxiliary pulleys 15, 15' and 16, 16'. FIG. 5 shows other arrangements including a motor driven pulley 17 and auxiliary pulleys 18, 18'. In both cases, the lower auxiliary pulleys 16, 16' and 18, 18' tend to be moved toward each other by means of springs (not shown) so as to prevent slip as well as disengagement of the cord 11 from the pulleys when the cord slackens.

Figure 6:
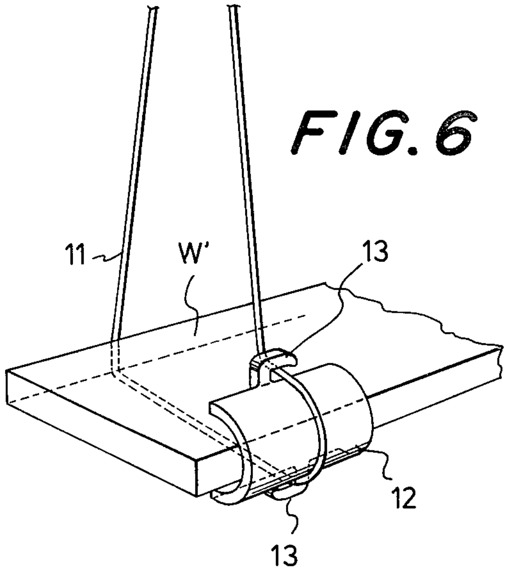
FIG. 6 shows a grip attached to the endless cord for supporting flat substance.

In FIG. 6, the cord 11 is provided with a substantially U-shaped grip 12 which is adapted to grip one edge of a flat object W so as to facilitate rotating of the object W. The grip 12 is preferably provided with hooks 13 at the ends of its outer surface so as to be detachably attached to the cord 11.

It is apparent that apparatus has been described which facilitates rotating a heavy object and in which the deficiencies in prior art apparatus of this type have been eliminated.

It is also apparent that although I have described several preferred embodiments of the present invention many changes and modifications can be made without departing from the spirit of the invention as expressed by the following claims.

I claim:

1. An apparatus for rotating a heavy object, said apparatus comprising:

a horizontal beam, said beam having a plurality of longitudinally spaced openings formed along its length, a pair of endless cord revolving units, means for selectively and longitudinally adjustably attaching each revolving unit to said beam, said last mentioned means comprising a pair of pins, wherein each pin is insertable through registering apertures formed in a respective revolving unit and through one of said openings formed in said beam whereby said revolving units are secured to and longitudinally spaced along said beam, means for holding said beam in an elevated position, said holding means comprising hook means supported above said beam and at least one elongated flexible member, said flexible member secured at one end to one pin and at its other end to the other pin, wherein said flexible member is secured substantially at its midpoint by said hook means to thereby maintain said beam in an elevated and horizontal position; and means for detachably connecting said object to said endless cord revolving units wherein said last mentioned means comprises endless cords actuated by said units and forming loops, said object being positioned within the loops formed by said endless cords whereby actuation of said units produces rotation of said object.

2. The apparatus as defined in claim 1 and in which said units comprise endless cords actuated by said units and said object fits within said loops, said units each being provided with a plurality of pulleys receiving said endless cord.

3. The apparatus as defined in claim 1 and including a grip member grippingly engaging said object and said grip member including means detachably attached to said endless cord.

* * * * *